United States Patent [19]
Minakawa

[11] Patent Number: 5,416,641
[45] Date of Patent: May 16, 1995

[54] MAGNETIC RECORDING/REPRODUCING APPARATUS INCLUDING A SWITCH FOR SELECTIVELY SUPPLYING A REFERENCE SIGNAL TO THE RECORDING UNIT

[75] Inventor: Tokuichi Minakawa, Tokyo, Japan
[73] Assignee: Akai Electric Co., Ltd., Tokyo, Japan
[21] Appl. No.: 944,973
[22] Filed: Sep. 15, 1992

Related U.S. Application Data

[62] Division of Ser. No. 721,349, Jun. 28, 1991, Pat. No. 5,257,109.

[30] Foreign Application Priority Data

| Jul. 2, 1990 | [JP] | Japan | 2-175131 |
| Jul. 4, 1990 | [JP] | Japan | 2-176593 |
| Jul. 11, 1990 | [JP] | Japan | 2-183198 |
| Jul. 12, 1990 | [JP] | Japan | 2-184918 |
| Jul. 23, 1990 | [JP] | Japan | 2-194613 |

[51] Int. Cl.⁶ .................. G11B 5/02; G11B 27/36; G11B 5/03
[52] U.S. Cl. ...................... 360/27; 360/25; 360/31; 360/66
[58] Field of Search ........ 360/27, 33.1, 24, 18, 360/25, 66, 31; 358/340, 167, 36, 34, 171, 310, 323; 348/607

[56] References Cited

U.S. PATENT DOCUMENTS

| 4,038,692 | 7/1977 | Umeda et al. | 360/25 |
| 4,437,128 | 3/1984 | Sapkowski | 358/335 |
| 4,613,912 | 9/1986 | Shibata et al. | 360/19.1 |
| 4,641,206 | 2/1987 | Iwafune | 360/24 X |
| 4,698,696 | 10/1987 | Matsuo | 358/340 |
| 4,768,094 | 8/1988 | Ichinoi | 358/167 |
| 4,786,986 | 11/1988 | Yamanushi et al. | 360/33.1 |
| 4,792,855 | 12/1988 | Yoshida | 358/167 |
| 4,802,016 | 1/1989 | Kaneko | 358/327 |
| 4,807,056 | 2/1989 | Sasaki et al. | 360/27 |
| 4,833,537 | 5/1989 | Takeuchi et al. | 358/167 |
| 4,885,639 | 12/1989 | Nakata et al. | 358/340 |
| 4,908,581 | 3/1990 | Honjo | 358/327 |
| 4,922,331 | 5/1990 | Ezaki | 358/31 |
| 4,987,501 | 1/1991 | Hori | 360/66 X |
| 5,032,915 | 7/1991 | Ichimura | 358/340 |
| 5,067,026 | 11/1991 | Kaneko | 358/340 |

FOREIGN PATENT DOCUMENTS

| 0066511A1 | 12/1982 | European Pat. Off. |
| 0241227A3 | 10/1987 | European Pat. Off. |
| 0265930 | 5/1988 | European Pat. Off. |
| 3917576A1 | 12/1989 | Germany |
| 59-002210 | 1/1984 | Japan |
| 59-187255 | 10/1984 | Japan |
| 61-296887 | 12/1986 | Japan |
| 63-059287 | 3/1988 | Japan |
| 63-146674 | 6/1988 | Japan |
| 64-14178 | 1/1989 | Japan |
| 2179487 | 3/1987 | United Kingdom |

OTHER PUBLICATIONS

T. Bannai, et al, "Wide Band Video Signal Recorder Having Level and Linearity Corrector," IEEE Transactions on Consumer Electronics, vol. CE-32, No. 3, pp. 268-273, Aug. 1986.

*Primary Examiner*—Aristotelis Psitos
*Assistant Examiner*—Jennifer Pearson
*Attorney, Agent, or Firm*—Stevens, Davis, Miller & Mosher

[57] ABSTRACT

A magnetic recording/reproducing apparatus, which includes: a reproduced level detector for detecting the level of a reproduced signal and a memory for storing the reproduced level detected by the detector; and when recording a video signal, the signal is recorded and reproduced in advance, and this reproduced level is stored in the memory, so that an amount of emphasis of a detail emphasis circuit in a reproducing system and an amount of equalization of an FM equalizer in the recording system can be controlled in accordance with the stored reproduced level; while when reproducing the video signal, the level of a reproduced FM luminance signal is detected by the reproduced level detector, so that an amount of equalization of an FM equalizer, an amount of cancellation of a line noise canceler, and an amount of cancellation of a noise canceler in a reproducing system can respectively be controlled in accordance with the detected reproduced level; whereby the characteristic of a video tape can be controlled in accordance with the type thereof on an apparatus-wide and integrated basis.

1 Claim, 12 Drawing Sheets

X1  Y1   $\sin\theta$

X2  Y2   $\sin(\theta+\frac{\pi}{2})$

X3  Y3   $\sqrt{2}\sin(\theta-\frac{\pi}{4})$

X4  Y4   $\frac{\sqrt{2}}{2}\sin(\theta-\frac{\pi}{4})$

X5  Y5   $\frac{1}{\sqrt{2}}\sin(\theta+\frac{\pi}{4})$

MAGNETIC RECORDING/REPRODUCING APPARATUS INCLUDING A SWITCH FOR SELECTIVELY SUPPLYING A REFERENCE SIGNAL TO THE RECORDING UNIT

This is a division of application Ser. No. 07/721,349, filed Jun. 28, 1991, and now U.S. Pat. No. 5,257,109.

BACKGROUND OF THE INVENTION

The invention relates to magnetic recording and reproducing apparatuses such as home VTRs in which a luminance signal of a video signal to be recorded is subjected to frequency modulation and then to single-sideband recording.

In home VTRs the frequency band of signals which can be recorded and reproduced is generally narrower than the frequency band of a frequency-modulated (FM) luminance signal of a video signal to be recorded and, as a result, highfrequency components of the upper sideband of this FM signal are neither recorded nor reproduced. It is for this reason that the FM signal takes the form of a single-sideband wave when recorded and involves an amplitude variation when reproduced. If this FM signal is demodulated with its amplitude variation removed by a limiter, the aforesaid high frequencies of its upper sideband can be recovered. This is how the single-sideband recording is performed.

By the way, in the FM signal that has been passed through the limiter, the modulation indices of the high-frequency components of its recovered upper sideband and the low-frequency components of its lower sideband are decreased, and this acts to decrease the level of the FM signal. When this FM signal is demodulated, the energy of the high-frequency components of its demodulated luminance signal becomes smaller than that of its low-frequency components, thereby decreasing the signal level as a whole. To compensate for this decrease of the signal level, the home VTR employs a peaking circuit to boost the high-frequency components of the demodulated luminance signal. This peaking circuit serves to keep the level of the high-frequency components of the demodulated luminance signal as high as that of its low-frequency components.

Further, video tapes for the home VTRs include normal tapes and so-called "high-grade tapes" that exhibit higher performance than the normal tapes. To make the most of the performance of high-grade tapes, the characteristics of a recording or reproducing system of a VTR must be differentiated between high-grade tapes and normal tapes. For example, the following means could be proposed to implement such differentiation.

(1) Controlling the level of emphasis at a detail emphasis circuit in a recording system in which a luminance signal of a video signal is frequency-modulated and then magnetically recorded. The detail emphasis circuit serves to emphasize small-level signal components in the high-frequency components of the luminance signal before frequency modulation;

(2) Controlling the amount of equalization at an FM equalizer which serves to boost the low-frequency components of an FM luminance signal in the recording system in which the luminance signal of a video signal is frequency-modulated and then magnetically recorded;

(3) Controlling the amount of peaking at an FM peaking circuit which serves to boost the high-frequency components of an FM luminance signal before demodulation in a reproducing system in which a reproduced luminance signal is frequency-demodulated; and (4) Controlling the amount of cancellation at a noise canceller which serves to cancel noise of a demodulated luminance signal in the reproducing system in which a reproduced luminance signal is freguency-demodulated.

The recording and reproducing systems of a home VTR will be outlined next with reference to FIG. 3.

The recording system will be described first. In FIG. 3, an input terminal 1 receives a video signal from a TV receiver or the like (not shown). This video signal is applied to a LPF 2, where a luminance signal is extracted, and the extracted luminance signal is then applied to an AGC 3, which controls the applied signal in such a manner that the level of its synchronizing signal can be kept constant. The video signal fed to the input terminal 1 is also applied to a BPF (not shown), where a chroma signal is extracted, and the extracted chroma signal is then converted into a low-frequency signal at a chroma signal processing circuit (not shown).

The luminance signal which has been through with the AGC 3 is then fed to a detail emphasis circuit 4, where small-level signal components in high-frequency components of the luminance signal are emphasized, and the emphasized signal is then applied to a luminance signal processing circuit 5. In the luminance signal processing circuit 5, the high frequencies are subjected to emphasis and a like process and then applied to a frequency modulator 6. The luminance signal frequency-modulated at the frequency modulator 6 has its low frequencies boosted by an FM equalizer 7, and low frequencies that correspond to the band of the low-frequency converted chroma signal are cut off at a HPF 8. The FM luminance signal which has been passed through the HPF 8 is then applied to a recording amplifier 9, where it is amplified while being mixed with the low-frequency converted chroma signal from the input terminal 10, and the thus processed signal is then supplied to a video head 11 to be magnetically recorded on a video tape 12.

The reproducing system will be described next. A video head 13, though shown separately from the video head 11 for purposes of convenience, is the same as the video head 11. A video signal reproduced from the video head 13 is amplified by a preamplifier 14, and not only a chroma signal that is subjected to low-frequency conversion by a LPF 15 is extracted, but also a luminance signal that is frequency-modulated by a HPF 16 is extracted. The chroma signal which has been through with the LPF 15 is converted into a chroma signal of a subcarrier band by a chroma signal processing circuit 17 and the converted chroma signal is then supplied to a mixing circuit 18.

The luminance signal, which has been passed through the HPF 16 has its high-frequency components (around 5 MHz) boosted by an FM equalizer 19, is kept at a constant level by an FM AGC 20 thereafter, and is then demodulated when applied to a frequency demodulator 21. The luminance signal delivered from the FM demodulator 21 is appropriately processed by a luminance signal processing circuit 22, and has its high-frequency components (2 MHz or more) boosted by a subsequent peaking circuit 23. The luminance signal which has been passed through the peaking circuit 23 is applied to a line noise canceller 24.

As shown in FIG. 4 in detail, the line noise canceller 24 delays a luminance signal fed from an input terminal 27 via the peaking circuit 23 for a single horizontal scanning period (hereinafter referred to simply as "1H") by a 1H delay element 28. The thus delayed luminance signal and the original luminance signal that has not been delayed are subjected to subtraction at a subtractor (which is shown as an adder 29, but acts as a subtractor because its polarity is inverted by the 1H delay element 28). Only a small-level signal which can be deemed as a noise component is extracted from the subtracted signal by a limiter 30, and the level of this small-level signal is attenuated by ½ at an attenuator 31. The attenuated signal is then subtracted by a subtractor shown as an adder 32, so that the noise component can be canceled. The luminance signal whose noise component has been canceled is then led to a noise canceller 25 from an output terminal 33.

The noise canceller 25 extracts high-frequency components containing much noise from the luminance signal that has been passed through the line noise canceller 24, and components whose levels are greater than a predetermined level are removed from the high-frequency components by a slice circuit (not shown). The output of the slice circuit is then subtracted from the luminance signal that has been passed through the line noise canceller 24 to cancel the noise.

The luminance signal which has been passed through the noise canceller 25 is applied to the mixing circuit 18 so as to be mixed with the chroma signal, the mixed signal is then delivered to an output terminal 26 and fed to a well known CRT or the like (not shown), so that a reproduced image cam be obtained.

The so-called high-grade tapes are commercially available as video tapes for home VTRs. The high-grade tape can provide not only a high reproducing output from the tape but also a remarkably improved signal-to-noise ratio by its extremely high degree of granulation and loading of magnetic powder.

That is, as shown in a characteristic diagram in FIG. 5, a high-grade tape a1 exhibits an output level higher than a normal tape b1, with the characteristic that its output level becomes higher especially in a high-frequency range (4 to 6 MHz) than in a low-frequency range (1 to 2 MHz).

When a video signal is recorded/reproduced using the high-grade tape, the levels of components such as the carrier wave, the low-frequency components of the upper sideband, and the high-frequency components of the lower sideband in the reproduced FM signal are boosted, making the levels of components such as the carrier wave, the low-frequency components of the upper sideband, and the high-frequency components of the lower sideband in the reproduced FM signal that has been passed through the limiter 30 higher than in the normal tape. Also, the levels of components such as the high-frequency components of the upper sideband and the low-frequency components of the lower sideband in the reproduced FM signal that has been passed through the limiter 30 become relatively lower than the levels of the low-frequency components of the upper sideband and the high-frequency components of the lower sideband as described before. And this makes the high-frequency signal level of the demodulated luminance signal low with respect to its low-frequency signal level that is maintained at a predetermined level, with this high-frequency signal level being lower than that in the normal tape. When the high-frequency signal level is so low as this, it cannot be adequately compensated for by the peaking circuit 23 if the circuit 23 is set to the normal tape mode.

FIG. 6 shows levels of demodulated video signals for both a high-grade tape a2 and a normal tape b2, indicating that the high-grade tape outputs a lower signal level at high frequencies than the normal tape. It is well known that high-grade tapes produce low reproduced outputs at high frequencies, and this results in blurring reproduced images.

To compensate for the impaired reproduction due to blurred images which are caused by deterioration in the high frequencies of a luminance signal of a recorded/reproduced video signal when operating a home VTR, the detail emphasis circuit 4, which serves to emphasize low-level signal components in high frequencies of a luminance signal to be recorded is provided as described above.

As shown in FIG. 13, the aforesaid detail emphasis circuit 4 is made up of a HPF 78, an amplifier 79, a limiter 80, an attenuator 81, an adder 82, and the like. A luminance signal received at an input terminal 70 from the AGC 3 is subjected to a process so that its high-frequency components are extracted by the HPF 78, and the extracted components are then amplified by the amplifier 79. The amplified high-frequency components are then applied to the limiter 80 so that the small-level signal components are extracted. The high-frequency small-level signal components which have been passed through with the limiter 80 are subjected to level adjustment by the attenuator 81 and to addition thereafter by the adder 82 so as to be added to the luminance signal from the input terminal 70. Then, the thus processed signal is applied to the luminance signal processing circuit 5 via an output terminal 84.

In a VTR having this detail emphasis circuit 4, if it assumed that a high-frequency small-level signal component incorporated in the luminance signal of a video signal to be recorded, i.e., an input detail signal, is such as one shown by b3 in FIG. 15A, then this input detail signal b3 is subjected to emphasis by the detail emphasis circuit 4 in the normal tape mode so that it will become a signal such as shown by b4 in FIG. 15A. When the thus processed input detail signal b4 is recorded/reproduced by a normal tape, and further demodulated, a signal similar to the input detail signal b3 is reproduced as shown by b5 in FIG. 15A.

By the way, if an input detail signal a3 shown in FIG. 15B which is similar to the input detail signal b3 is subjected to emphasis by the detail emphasis circuit 4 in the normal tape mode so that it will be reformed into a signal a4 that is similar to the signal b4, and if this signal a4 is recorded/reproduced using a high-grade tape and further demodulated, then the level of this signal a4 becomes lower than that of the input detail signal a3 as shown by a signal a5 in FIG. 15B. Such decrease in the level of the detail signal results in blurs on reproduced images.

As described above, the amount of emphasis in the conventional detail emphasis circuit is not sufficient to compensate for the blurs on the reproduced images when high-grade tapes are used.

Further, to automatically provide the optimal performance of a video tape in accordance with its type as well as to automatically compensate for deterioration in the characteristic of a video tape in accordance with its type, the following means have heretofore been known.

(1) To identify the type of a video tape by the level of a reproduced signal, the frequency characteristic of a recording system is adjusted in such a manner that a reproduced level is detected and stored and the frequency characteristic of an FM luminance signal is adjusted in accordance with the stored reproduced level (Japanese Patent Unexamined Publication No. 146674/1988);

(2) The amount of compensation for a frequency characteristic is kept unchanged by changing the peaking amount at an FM equalizer in the reproducing system while detecting the envelope of a reproduced FM signal and using this detected output as a control signal, even if the frequency characteristic of a video tape has been changed (Japanese Patent Unexamined Publication No. 59287/1988); and (3) A noise component from an original signal is subtracted by separating high-frequency components in the reproduced luminance signal at which noise tends to concentrate by a filter, i.e., the noise canceller 25 described as being included in the reproducing system, and by further filtering the low-level signal components out by the slice circuit, so that the high-frequency low-level signal is considered as the noise and subtracted from the original signal; that is, an FM luminance signal reproduced from a video tape is detected using an FM reproducing level detector and the slice level of the slice circuit is decreased with increasing reproduced levels (e.g., in the case of a high-grade tape) (Japanese Patent Unexamined Publication No. 14178/1989).

Incidentally, since the noise canceller 25 at which the slice level remains constant regularly cancels any high-frequency low-level signal components, the original signal components other than the noise may also be canceled. For this reason, it is preferable to set the amount of cancellation to a small value for high-grade tapes in which the signal-to-noise ratio is significantly improved but the high-frequency level of their demodulated luminance signal is decreased.

The line noise canceller shown in FIG. 4 does cancel not only noise components but also small-level signal components (detail signals) to a certain degree, thus causing the level of small-level signals to be decreased.

Further, while there is no attenuation in the level of a luminance signal that is in identical correlation with a luminance signal of 1H before, once there is any deviation from the correlation, the level of the deviating signal is decreased as much as such deviation.

The cases where the correlation is identical and where there is a deviation in the correlation will be described with reference to FIGS. 7A–7E and 8A–8E. Signals X1 to X5 in FIGS. 7A–7E show a case of the identical correlation, where X1 is an original signal; and X2, a signal of 1H before. These signals are in phase. Signal X3 is an output of the adder 29, which is set to level 0; X4, an output of the attenuator 31, which is likewise set to level 0; and X5, an output of the adder 32, producing a signal identical to the original signal shown by X1. Signals Y1 to Y5 show a case where a signal of 1H before is 90° ahead of an original signal, with the original signal and the signal of 1H before being assumed to be such small-level signals as not to be limited by the limiter 30.

Signal Y1 is an original signal, expressed by $\sin\theta$; Y2, a signal of 1H before, expressed by $\sin(\theta+\pi/2)$, or $\sin(\theta+\pi/2)=\cos\theta$. Signal Y3 is an output of the adder 29, which is expressed by $Y1-Y2=\sin\theta-\cos\theta$, or $\sin\theta-\cos\theta=\sqrt{2}\sin(\theta-\pi/4)$ in a composite equation. Signal Y4 is an output of the attenuator 31, which is $\frac{1}{2}$ the level shown by signal Y3, or $\sqrt{2}/2\sin(\theta-\pi/4)$. Signal Y5 is an output of the adder 32, which is $\sin\theta-\frac{1}{2}\{\sin\theta-\cos\theta\}=\frac{1}{2}\sin\theta+\frac{1}{2}\cos\theta$, or $1/\sqrt{2}\sin(\theta+\pi/4)$ in a composite equation.

As described above, the level of the original signal Y1 is decreased by 30% at the stage of the output signal Y5 and the phase of signal Y5 is 45° ahead.

Small-level signals are generally less correlative in terms of line compared with large-amplitude signals. While no images can be recognized with the large amplitude signals having no line-based correlation, the small-level signals can produce recognizable images with no such correlation. For example, in the case of irregularities of human skin, there is no correlation. Signals Z1 to Z5 shown in FIGS. 8A–8E present a case where there is no correlation between an original signal and a signal of 1H before. In FIGS. 8A–8E, signal Z1 is a projecting original signal; Z2, a flat signal of 1H before, these signals having such small-amplitudes as not to be limited by the limiter 30; Z3, an output of the adder 29, which has a projecting waveform identical with the original signal; Z4, an output of the attenuator 31, whose amplitude is $\frac{1}{2}$ that of the original signal Z1; and Z5, an output of the adder 32, whose amplitude is $\frac{1}{2}$ that of the original signal Z1.

Accordingly, while serving to reduce noise, the line noise canceller 24 also decreases the level of the detail signal to some extent, and if there is a deviation from the correlation between the detail signal and the luminance signal of 1H before, the line noise canceller decreases the level of the detail signal as much as that deviation.

By the way, the aforesaid means have heretofore been known to automatically provide an optimal performance of a video tape in accordance with its type such as a normal tape or a high-grade tape, as well as to automatically compensate for deterioration in the characteristic of a video tape in accordance with its type. However, these means are not successful in effectively providing the optimal performance and compensating for the deterioration in the characteristic in accordance with the type of a video tape.

Let us now take a look at a case where a noise canceller disclosed in Japanese Patent Unexamined Publication No. 14178/1989 is used.

It is generally known that, when a color video signal is reproduced from a VTR and a luminance signal thereof is demodulated thereafter, an unwanted component of about 1.2 MHz is present in the demodulated luminance signal. The level of this unwanted component is increased with higher level of a reproduced chroma signal, i.e., higher degree of color saturation.

Some reasons why this unwanted component is present will be described. In the case of magnetic recording on a VTR, a recording current is subjected to third order distortion by hysteresis and magnetized as such on the tape.

It is assumed that:

FM luminance signal $= A\sin\alpha$ low-frequency converted chroma signal $= B\sin\beta$, then, the above phenomenon on the tape can be expressed as follows.

$$y = (A\sin\alpha + B\sin\beta)^3$$
$$= A^3\sin^3\alpha + B^3\sin^3\beta + 3A^2B\sin^2\alpha\cdot\sin\beta + 3AB^2\sin\alpha\cdot\sin^2\beta$$

With

FM luminance signal component $= A^3\sin^3\alpha$

Low-frequency converted chroma signal component $= B^3\sin^3\beta$ $3A^2B\sin^2\alpha\cdot\sin\beta$; $3AB^2\sin\alpha\cdot\sin\beta$ will be developed. as follows $$\sin^2\alpha\cdot\sin\beta = \tfrac{1}{2}\{\cos(\alpha-\beta) - \cos(\alpha+\beta)\}\cdot\sin\alpha$$
$$= \tfrac{1}{2}\{\cos(\alpha-\beta)\cdot\sin\alpha - \cos(\alpha+\beta)\cdot\sin\alpha\}$$
$$= \tfrac{1}{2}\left[\tfrac{1}{2}\{\sin(\alpha-\beta+\alpha) - \sin(\alpha-\beta-\alpha)\} - \tfrac{1}{2}\{\sin(\alpha+\beta+\alpha) - \sin(\alpha+\beta-\alpha)\}\right]$$
$$= \tfrac{1}{4}\{\sin(2\alpha-\beta) - \sin(2\alpha+\beta) - \sin(-\beta) + \sin\beta\}$$

Similarly, $$\sin\alpha\cdot\sin^2\beta = \tfrac{1}{2}\{\cos(\alpha-\beta) - \cos(\alpha+\beta)\}\cdot\sin\beta$$
$$= \tfrac{1}{2}\{\cos(\alpha-\beta)\cdot\sin\beta - \cos(\alpha+\beta)\cdot\sin\beta\}$$
$$= \tfrac{1}{2}\left[\tfrac{1}{2}\{\sin(\alpha-\beta+\beta) - \sin(\alpha-\beta-\beta)\} - \tfrac{1}{2}\{\sin(\alpha+\beta+\beta) - \sin(\alpha+\beta-\beta)\}\right]$$
$$= \tfrac{1}{4}\{2\sin\alpha - \sin(\alpha+2\beta) - \sin(\alpha+2\beta)\}$$

FIG. 9 is a spectrum obtained when a signal magnetized on a video tape has been reproduced. Reference character a designates a low-frequency converted chroma signal $\sin^3\beta$; b, an unwanted component $\sin(\alpha-2)$; c, an FM luminance signal $\sin^3\alpha$; d, an unwanted component $\sin(\alpha+2\beta)$; and e, f, unwanted components $\sin(2\alpha-\beta)$, $\sin(2\alpha+\beta)$, respectively. Among these unwanted components, the high-frequency components e, f produce so small output levels that they can be considered negligible.

In the case where noise of a luminance signal reproduced from a normal tape is to be canceled by the noise canceller whose amount of cancellation is varied in accordance with the level of the reproduced FM luminance signal as described above, the slice level is increased, so that the unwanted components b, d will also be canceled.

However, in the case where noise of a luminance signal reproduced from a high-grade tape is to be canceled and where an image such as an animation whose color saturation is high is to be reproduced, the unwanted components b, d will not be canceled despite the fact that the slice level is small, because these components b, d are comparatively large.

The presence of the unwanted components b, d in a luminance signal causes mesh-like noise to appear over the entire part of a reproduced image, making the image indistinct.

In the case of an image with a low color saturation, the levels of the unwanted components b, d are low even if a luminance signal is derived from a high-grade tape, thereby causing no mesh noise to appear.

SUMMARY OF THE INVENTION

A first object of the invention is to provide a magnetic recording/reproducing apparatus which is capable not only of automatically providing a better performance of a video tape or the like in accordance with the type thereof than conventional apparatuses, but also of automatically compensating for deterioration in the characteristic of a video tape or the like in accordance with the type thereof.

A second object of the invention is to provide a magnetic recording apparatus or a magnetic recording/reproducing apparatus capable of producing a single-wavelength reference signal with using no independent oscillator in a magnetic recording/reproducing apparatus, in which, to automatically control the characteristics of a recording or reproducing system in accordance with the type of a video tape, a single-wavelength reference signal is recorded on and reproduced from the video tape, and the level of the reproduced reference signal is detected and stored.

A third object of the invention is to provide a magnetic recording/reproducing apparatus which is capable of preventing the mesh noise from appearing.

To achieve the above objects, the invention is applied to a magnetic recording/reproducing apparatus, which includes:

a reproduced level detector for detecting the level of a reproduced signal and a memory for storing the reproduced level detected by the detector; and when recording a video signal, the signal is recorded and reproduced in advance, and this reproduced level is stored in the memory, so that an amount of emphasis of a detail emphasis circuit in a reproducing system and an amount of equalization of an FM equalizer in the recording system can be controlled in accordance with the stored reproduced level; while when reproducing the video signal, the level of a reproduced FM luminance signal is detected by the reproduced level detector, so that an amount of equalization of an FM equalizer, an amount of cancellation of a line noise canceller, and an amount of cancellation of a noise canceller in a reproducing system can respectively be controlled in accordance with the detected reproduced level; whereby the characteristic of a video tape can be controlled in accordance with the type thereof on an apparatus-wide and integrated basis.

Instead of controlling the amount of equalization of the reproducing system FM equalizer, a peaking amount of a reproducing system peaking circuit may be controlled.

The magnetic recording/reproducing apparatus also includes a chroma level detector which serves to detect the level of a reproduced chroma signal at the time a low-frequency converted and recorded chroma signal is reproduced and further converted into a subcarrier band, so that an amount of cancellation of the noise canceller can be controlled in accordance with the chroma level detected by the chroma level detector.

The thus implemented magnetic recording/reproducing apparatus records and reproduces a video signal in advance when recording the video signal, and the reproduced level of the video signal is stored in the memory. And the amount of emphasis of the recording system detail emphasis circuit and the amount of equalization of the recording system FM equalizer are controlled in accordance with the stored reproduced level.

When reproducing the video signal, the level of the reproduced FM luminance signal is detected by the reproduced level detector, and the amount of equalization of the FM equalizer, the amount of cancellation of the line noise canceller, and the amount of cancellation of the noise canceller in the reproducing system can respectively be controlled in accordance with the detected reproduced level.

If the peaking amount of the reproducing system peaking circuit is controlled instead of the amount of equalization of the reproducing system FM equalizer, then the peaking amount is controlled.

Further, the level of a reproduced chroma signal at the time the low-frequency converted and recorded chroma signal is reproduced and further converted into a subcarrier band is detected by the chroma level detector, and the amount of cancellation of the noise canceller is controlled in accordance with the detected chroma level.

Further, the invention is applied to a magnetic recording or magnetic recording/reproducing apparatus which has a dc voltage source that selectively applies a predetermined level of dc voltage to a frequency modulator, and the output of the frequency modulator obtained by applying the dc voltage to the frequency modulator is used as the reference signal.

The thus implemented magnetic recording or magnetic recording/reproducing apparatus obtains a single-wavelength reference signal from the frequency modulator by applying the dc voltage from the dc voltage source to the frequency modulator.

Further, the invention is applied to a magnetic recording/reproducing apparatus which includes means for detecting the level of a reproduced signal and storing the detected level, so that an amount of emphasis of the detail emphasis circuit can be controlled in accordance with the stored detected level.

The thus implemented magnetic recording/reproducing apparatus detects the level of a reproduced signal and stores the detected reproduced level, and the amount of emphasis of the detail emphasis circuit is controlled in accordance with the stored detected level.

Further, the invention is applied to a noise canceller used in a magnetic recording/reproducing apparatus, which noise canceller includes: an FM reproduced level detector which detects the level of a reproduced FM luminance signal; means for extracting a noise component from a luminance signal demodulated from the FM luminance signal; a slice circuit which has a slice level for removing a component whose level is higher than a predetermined level from the noise component and controls the slice level so as to be decreased with increasing reproduced level; and a subtractor which subtracts the output of the slice circuit from the luminance signal. In such a noise canceller, a chroma level detector is provided to detect the level of a reproduced chroma signal, so that a level of the slice circuit can be controlled so as to be increased with increasing detected chroma level.

In the thus implemented noise canceller in a magnetic recording/reproducing apparatus not only improves the resolution of the apparatus with the amount of cancellation being decreased as the level of the reproduced FM luminance signal increases, but also removes the unwanted components contained in the luminance signal with the amount of cancellation being increased when the level of a reproduced chroma signal is large, thereby eliminating mesh noise from reproduced images.

DETAILED DESCRIPTION OF THE PREFERRED EMBODIMENTS

A first embodiment of the invention will hereunder be described with reference to FIGS. 1 and 2.

Figure 1:
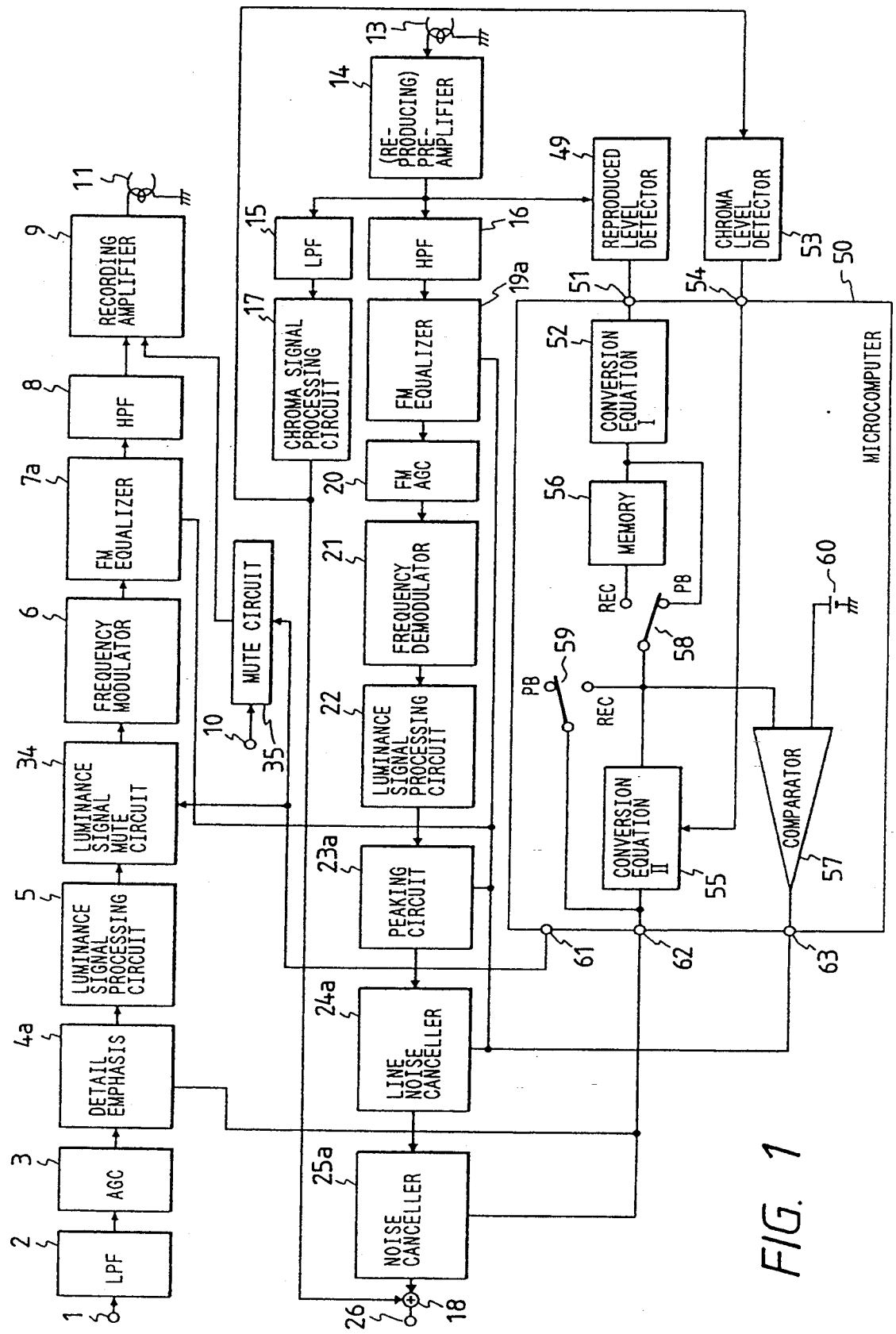
FIG. 1 is a block diagram showing an outline of a main portion of a recording/reproducing system of a home VTR, which is a first embodiment of the invention.
Figure 2:
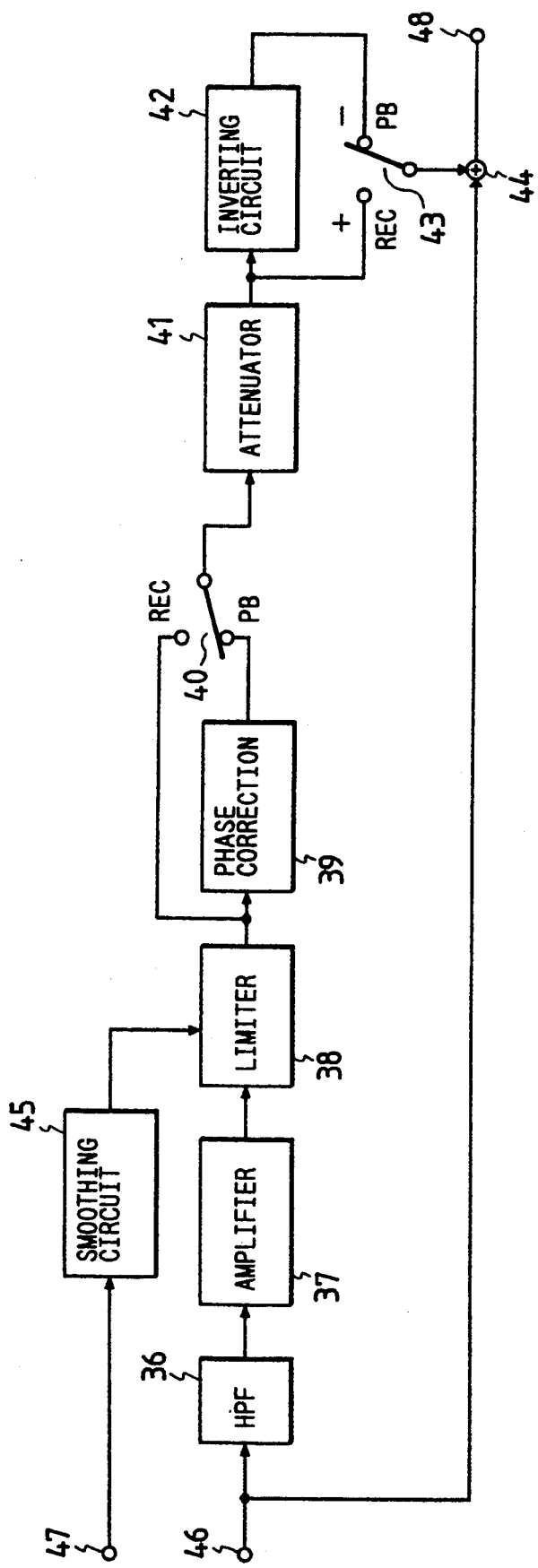
FIG. 2 is a block diagram showing a denial of the main portion of the recording/reproducing system shown in FIG. 1.

FIG. 1 is a block diagram showing an outline of a main portion of a recording/reproducing system of a home VTR; and FIG. 2 is a block diagram showing a detail of the main portion shown in FIG. 1.

Figure 3:
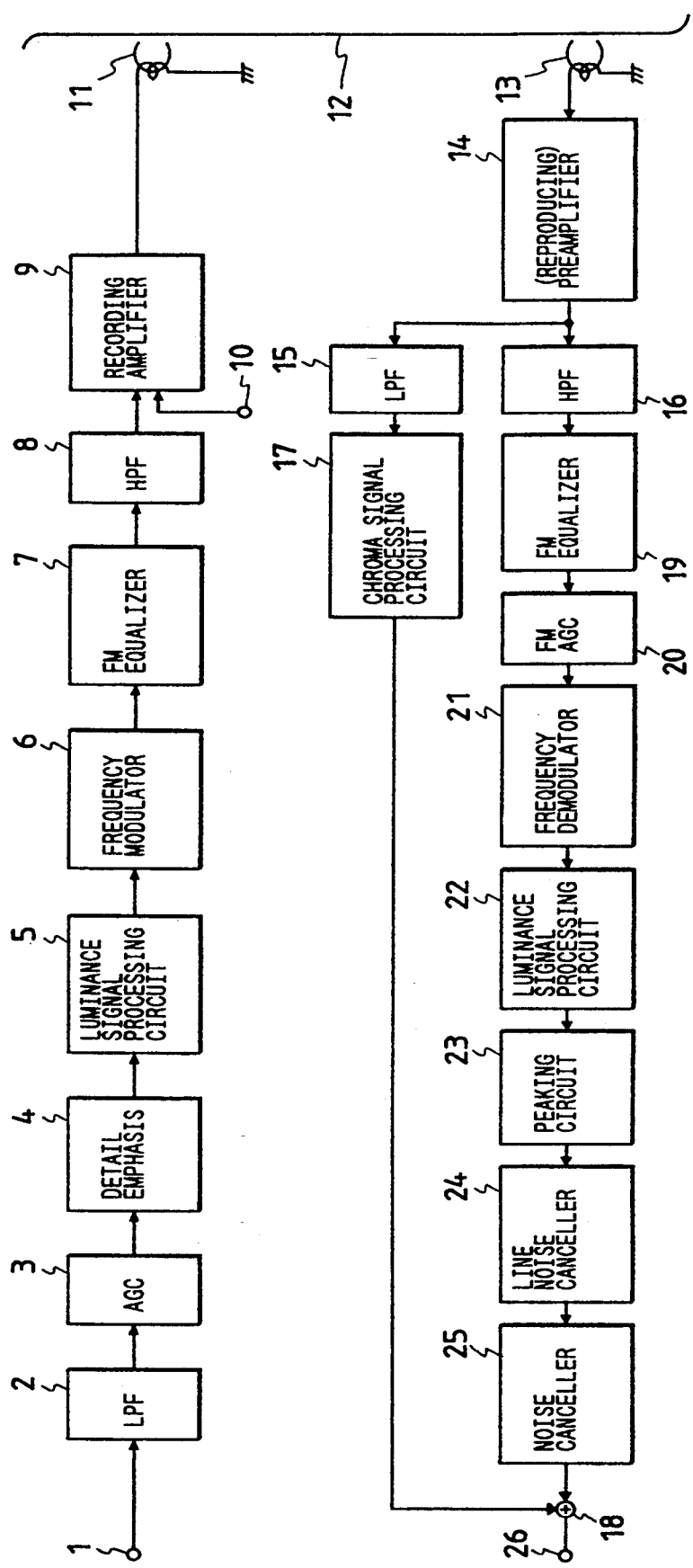
FIG. 3 is a block diagram showing an outline of a main portion of a recording/reproducing system of a conventional home VTR.
Figure 5:
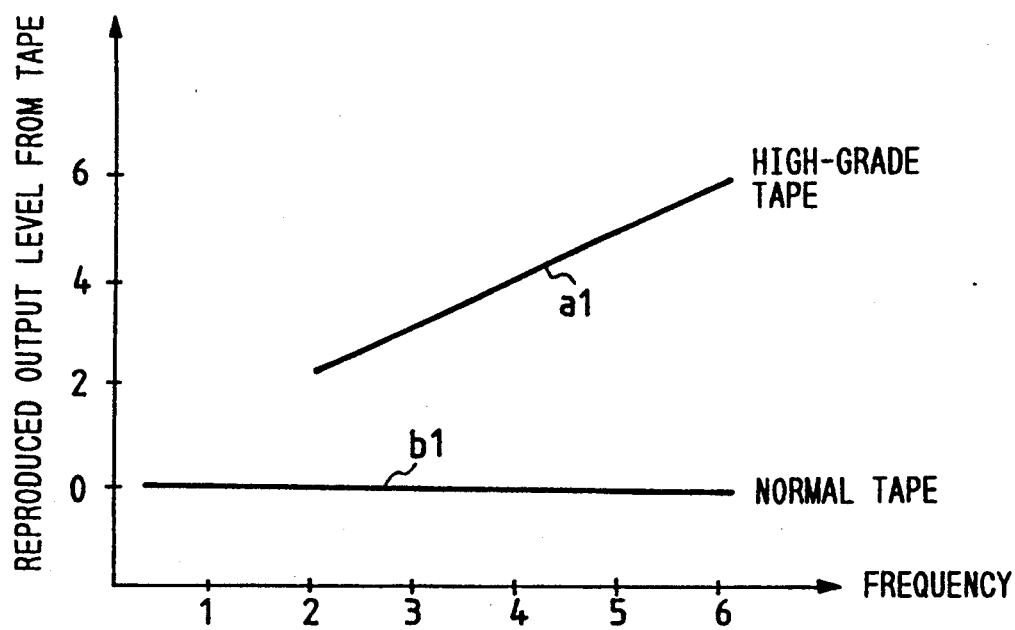
FIG. 5 is a characteristic diagram showing reproduced output levels of a normal tape and a high-grade tape.
Figure 6:
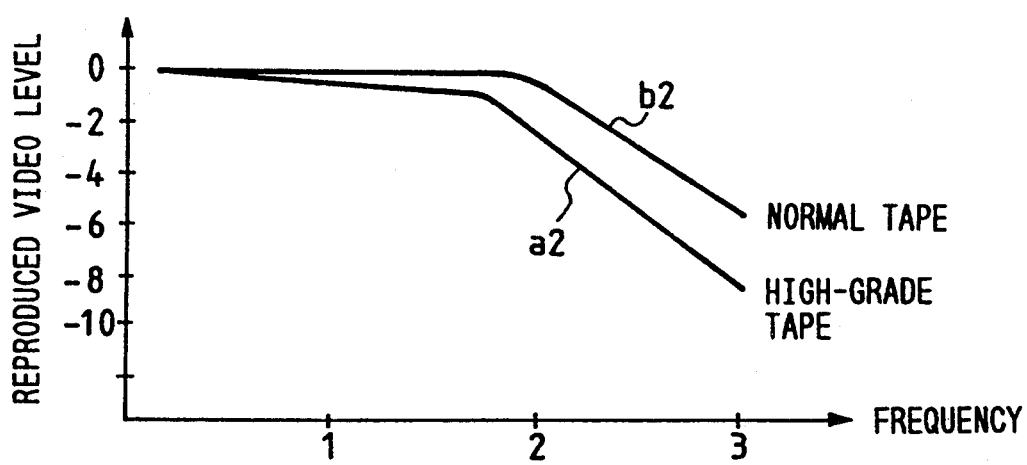
FIG. 6 is a characteristic diagram showing reproduced video levels of the normal tape and the high-grade tape.
Figure 7A:
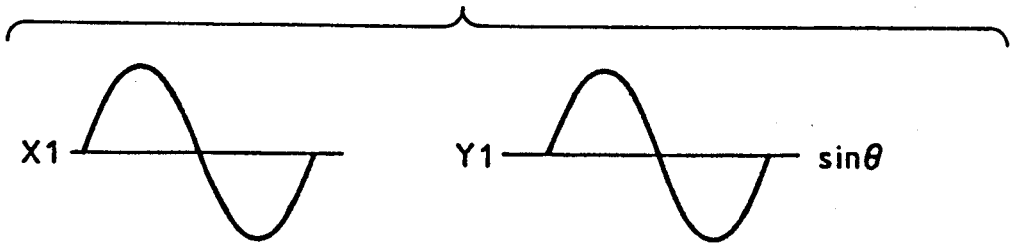
FIGS. 7A-7E and 8A-8E are waveform diagrams illustrative of an operation of the noise canceller.
Figure 7B:
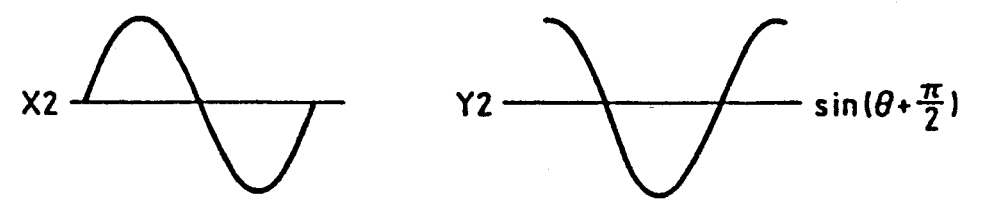
Figure 7C:
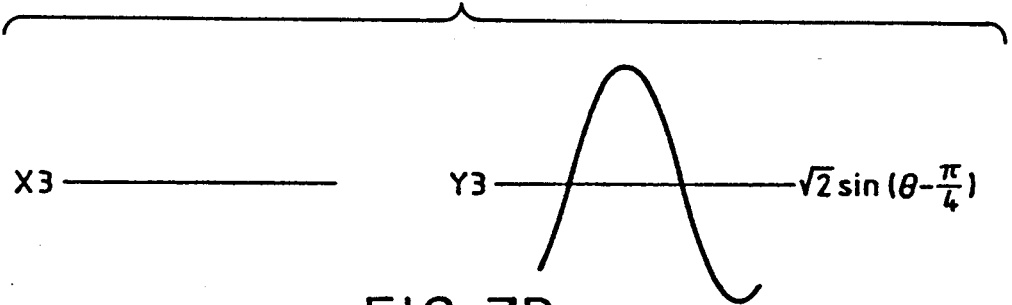
Figure 7D:
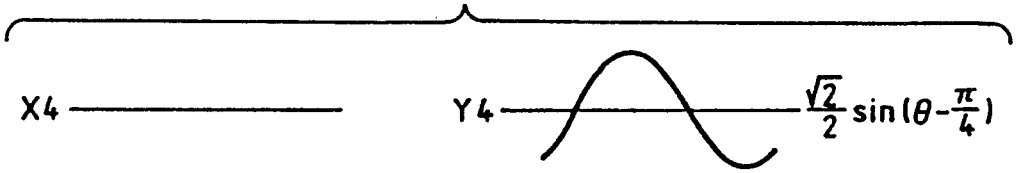
Figure 7E:
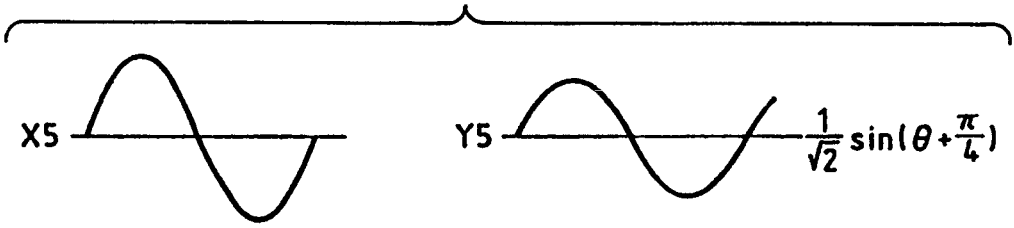
Figure 8A:
Figure 8B:
Figure 8C:
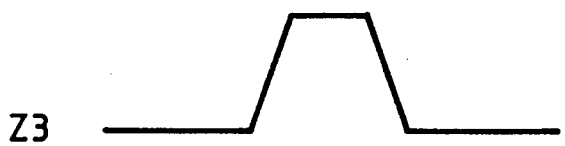
Figure 8D:
Figure 8E:
Figure 9:
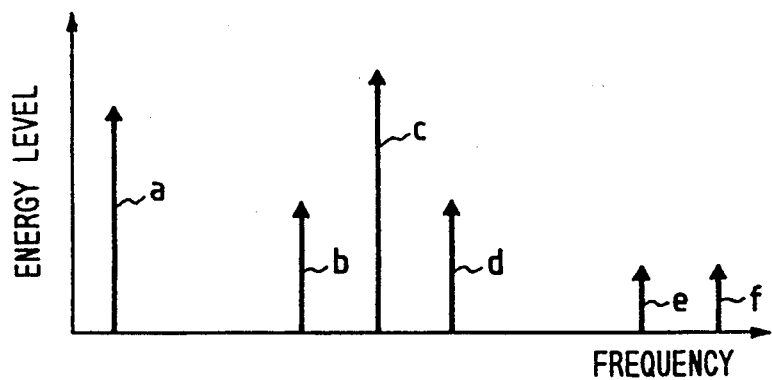
FIG. 9 is a spectrum of a signal which is magnetized on a video tape by a VTR and reproduced by a video head.

In FIG. 1, the same reference numerals and characters as in FIG. 3 designate the same parts and components, and the detailed description thereof will be omitted.

Reference character 4a designates a detail emphasis circuit. Although this circuit 4a emphasizes small-level components in high frequencies of a luminance signal in a manner similar to the detail emphasis circuit described in FIG. 3, the circuit 4a is distinguished from the circuit described in FIG. 3 in that the amount of emphasis is controlled in accordance with the level of a reproduced reference signal (described later). That is, in the case where the level of a reproduced reference signal is high as in a high-grade tape compared with a normal tape, the amount of emphasis is increased in accordance with this level, so that a reduction in the level of the high-frequency small-level components of a reproduced luminance signal can be compensated for in the high-grade tape.

Reference numeral 34 designates a luminance signal mute circuit. To record a reference signal, a predetermined voltage is applied from a microcomputer (described later) to the frequency modulator 6 with a control signal, and the frequency modulator outputs a single-wavelength signal of a predetermined frequency (e.g., 3.8 MHz). Reference numeral 35 designates a mute circuit, which serves to shut off the chroma signal supplied from the input terminal 10 to the recording amplifier 9 with a control signal from the microcomputer (described later) when the reference signal is to be recorded.

Figure 10:
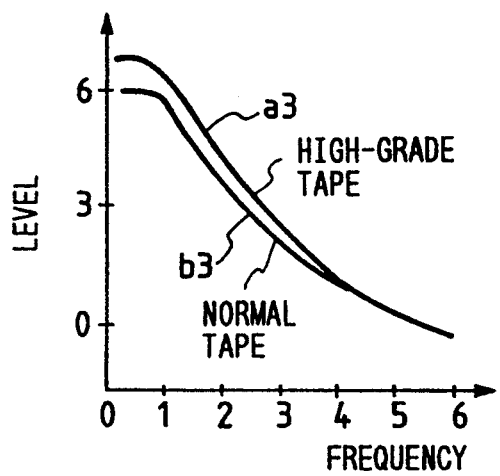
FIG. 10 is a characteristic diagram of an FM equalizer of the recording system shown in FIG. 1.

Reference numeral 7a is an FM equalizer in a recording system, which serves to boost low frequencies of an FM luminance signal in a manner similar to the FM equalizer 7. It is an amount of equalization that is controlled. That is, when it is judged that the used tape is a high-grade tape by the level of a reproduced reference signal, a control signal from the microcomputer (described later) boosts its low frequencies more than in the normal tape (b3) as shown by a3 in FIG. 10, thus alleviating the reduction in the level of the high frequencies of the reproduced and demodulated luminance signal.

Figure 11:
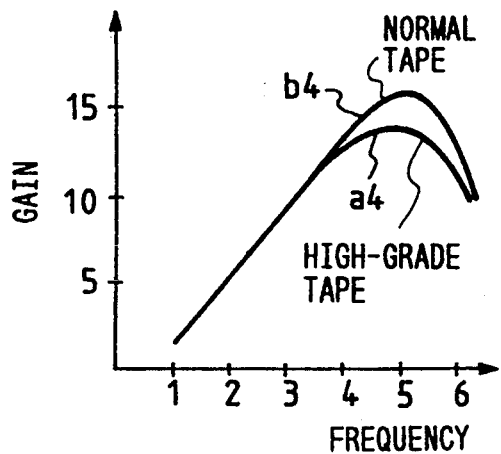
FIG. 11 is a characteristic diagram of an FM equalizer of the reproducing system shown in FIG. 1.

Reference numeral 19a designates an FM equalizer in a reproducing system, which serves to boost high frequencies of a reproduced FM luminance signal in a manner similar to the FM equalizer 19. It is the amount of equalization that is controlled. That is, when it is judged, as will be described later, that the used tape is a high-grade tape by the level of a reproduced reference signal, a control signal from the microcomputer (described later) drops the boosting level of the high frequencies compared with the normal tape (b4) as shown by a4 in FIG. 11 by, thus alleviating the reduction in the level of the high frequencies of the reproduced and demodulated luminance signal.

Figure 12:
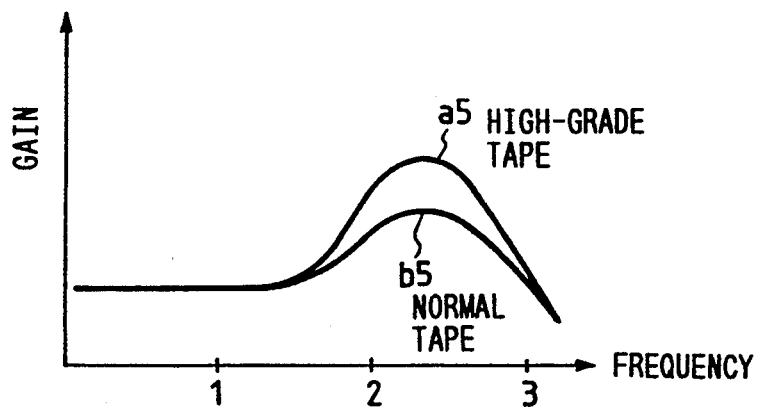
FIG. 12 is a characteristic diagram of a peaking circuit of the reproducing system shown in FIG. 1.
Figure 13:
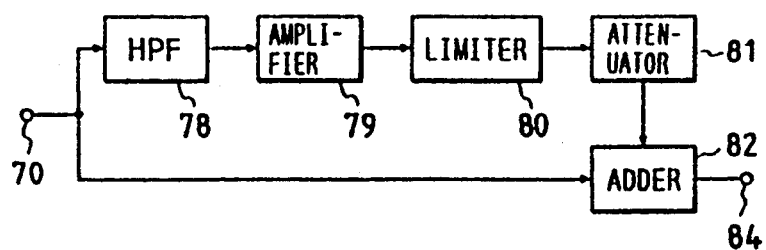
FIG. 13 is a block diagram showing a detail emphasis circuit in the recording/reproducing system shown in FIG. 3.
Figure 14A:
FIGS. 14A and 14B are a diagram showing signal levels in a conventional example.
Figure 14B:
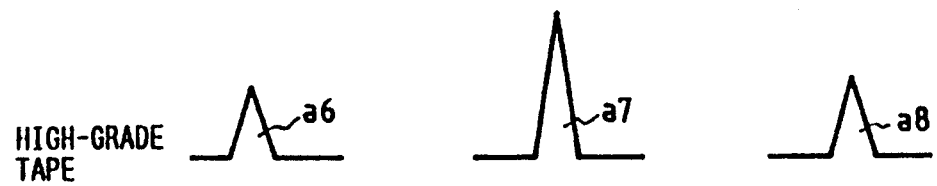
Figure 15A:
FIGS. 15A and 15B are a diagram showing signal levels in the first embodiment of the invention.
Figure 15B:

Reference numeral 23a designates a peaking circuit, which serves to boost high frequencies of a demodulated luminance signal in a manner similar to the peaking circuit 23. It is the amount of peaking that is controlled. That is, when it is judged, as will be described later, that the used tape is a high-grade tape by the level of a reproduced reference signal, a control signal from the microcomputer (described later) boosts the high frequencies more than in the normal tape (b5) as shown by a5 in FIG. 12, thus alleviating the reduction in the level of the high frequencies of the reproduced and demodulated luminance signal.

Figure 4:
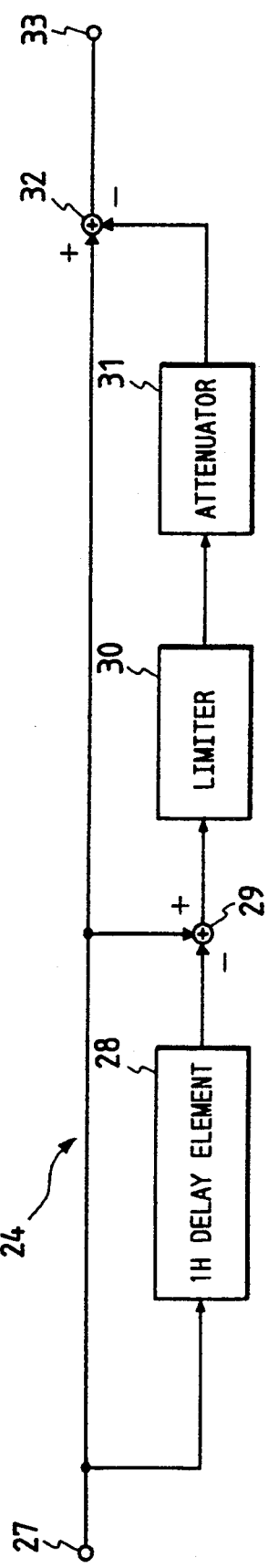
FIG. 4 is a block diagram showing a line noise canceller in the recording/reproducing system shown in FIG. 3.

Reference numeral 24a is a line noise canceller, which serves to cancel noise components in a manner similar to the line noise canceller 24, by delaying a luminance signal from the peaking circuit 23a for a period of 1H; subtracting the delayed luminance signal from the non-delayed original luminance signal using a subtractor; extracting from the subtracted signal only small-level components that can be deemed as noise components by a limiter. The canceller 24a is distinguished from the canceller 24 described in FIG. 4 in that a switch (not shown) is provided between the attenuator 31 and the adder 32. This switch is opened when it is judged, as will be described later, that the used tape is a high-grade tape by a reproduced FM luminance signal, causing the line noise canceller not to be operable if the noise is small and the reproduced level of the detail signal is comparatively small as in a high-grade tape.

Reference numeral 25a designates a noise canceller, which, as in the noise canceller 25 described before, extracts high-frequency components containing much noise from a luminance signal that has been passed through the line noise canceller 24a; causes a slice circuit to remove components whose levels are greater than a predetermined level from these extracted high-frequency components; and subtracts the output of the slice circuit from the luminance signal that has been through the line noise canceller 24a. The canceller 25a is distinguished from the canceller 25 in that the amount of cancellation of the former is controlled in accordance with the level of the reproduced FM luminance signal.

The detail emphasis circuit 4a and the noise canceller 25a are constructed of a single circuit that provides both functions by switching. FIG. 2 shows such double-function circuit that serves both as the circuit 4a and the canceller 25a. In FIG. 2, reference numeral 36 designates a HPF; 37, an amplifier; 38, a limiter; 39, a phase correction circuit; 40, a first recording/reproducing selector switch; 41, an attenuator; 42, an inverting circuit; 43, a second recording/reproducing selector switch; 44, an adder; and 45, a smoothing circuit. This double-function circuit is operated as the detail emphasis circuit 4a when the switches 40, 43 are set to the recording position, and as the noise canceller 25a when they are set to the reproducing position.

To operate this circuit as the detail emphasis circuit 4a, high-frequency components are extracted from a luminance signal fed from the AGC 3 via an input terminal 46 by the HPF 36, and the extracted components are amplified by the amplifier 37. Then, a detail signal is extracted from the amplified high-frequency components by the limiter 38; the level of the extracted detail signal is adjusted by the attenuator 41; and the thus processed signal to the luminance signal from the terminal 46 is added by the adder 44 and the added signal is supplied to the processing circuit 5 from an output terminal 48. A control signal of a pulse width modulator (PWM, described later) is applied from the input terminal 47, and this signal is smoothed by the smoothing circuit 45 into a dc voltage. This voltage changes the limit level of the limiter 38. If this voltage is, e.g., increased, the limiter level is decreased, while the voltage is decreased, the limiter level is increased. And an increasing limiter level increases the increment for the detail signal at the adder 44, which thereby increases the amount of emphasis, while a decreasing limiter level decreases the increment and eventually decreases the amount of emphasis.

To operate this double-function circuit as the noise canceller 25a, a reproduced luminance signal supplied from the line noise canceller 24a through the input terminal 46 is applied to the HPF 36, where high-frequency components and noise are extracted. The high-frequency components and the noise are amplified by the amplifier 37, and the noise is removed by the limiter 38. A phase deviation of the noise made at the HPF 36 is corrected by the phase correction circuit 39, and the corrected phase of the noise is aligned with the phase of the reproduced luminance signal from the input terminal 46. After the phase alignment, the level of the noise is adjusted by the attenuator 41, and the thus processed noise, having been through the inverting circuit 42, is then added to the luminance signal from the terminal 46 by the adder 44. That is, the noise whose level has been adjusted at the attenuator 41 is subtracted from the luminance signal from the terminal 46 at the adder 44. The luminance signal whose noise has been subtracted is then supplied from the output terminal 48 to the mixing circuit 18. While the noise canceller 25a is originally intended to subtract the noise at the adder 44, it does subtract the detail signal as well. For this reason, if the used tape is a high-grade tape that contains less noise, the limit level of the limiter 38 is so controlled as to be decreased commensurate with such level of the noise by a control signal from the input terminal 47 (described later). Conversely, if the used tape is a normal tape that has been used repeatedly, the limit level of the limiter 38 is so controlled that it will be increased.

Returning now to FIG. 1, reference numeral 49 designates a reproduced level detector, which serves to rectify either a reproduced reference signal or a reproduced FM luminance signal by means of envelope detection. If a signal from the preamplifier 14 is an FM luminance signal, it is desired that the signal sampled and held by a horizontal synchronizing signal be rectified. The reproduced level detected by the reproduced level detector 49 is applied to a conversion equation I 52 via a terminal 51 of the microcomputer 50.

Reference numeral 53 designates a chroma level detector, which serves to rectify a chroma signal from the chroma signal processing circuit 17 while detecting its degree of saturation. The chroma level from the chroma level detector 53 is applied to a conversion equation II 55 via a terminal 54 of the microcomputer 50.

In addition to the conversion equations I 52, II 55, the microcomputer 50 includes a memory 56, a comparator 57, a third recording/reproducing selector switch 58, and a fourth recording/reproducing selector switch 59. The conversion equation I 52 is stored by reading the reproduced level of a reference signal that has been recorded in a reference tape in advance. The conversion equation outputs a control signal after comparing a subsequently read level with this stored level that serves as a reference value. This control signal causes the duty ratio of the PWM to be linear in the lower direction at the time of recording and in the higher direction at the time of reproducing, when, e.g., a voltage that is higher than the reference signal is read. This control signal is stored in the memory 56. The conversion equation II 55 serves to weigh the control signal from the conversion equation I 52 in terms of the chroma level from the chroma level detector 53, i.e., in terms of the degree of color saturation. At the time of recording, the comparator 57 outputs a control signal that is at "H" level when the output of the memory 56 gets lower than a preset level of a power supply 60; otherwise, it outputs a control signal that is at "L" level. At the time of reproducing, the comparator 57 outputs a control signal that is at "H" level when the control signal from the conversion equation I 52 gets higher than the preset level of the power supply 60; otherwise, it outputs a control signal that is at "L" level.

The control signal from the conversion equation II 55 is supplied to the noise canceller 25a via a terminal 62, while the control signal from the memory 56 is fed to the detail emphasis circuit 4a via the terminal 62. Also, the control signal from the comparator 57 is supplied to the FM equalizer 7a in the recording system, and to the FM equalizer 19a, the peaking circuit 23a, and the line noise canceller 24a in the reproducing system via a terminal 63.

An operation of the thus constructed VTR will be described next.

Prior to recording a video signal, the VTR is set up so that the amount of emphasis of the detail emphasis circuit 4a and the amount of equalization of the FM equalizer 7a in the recording system can be set in accordance with the type of a video tape to be used. To do this, a control signal is sent from the terminal 61 of the microcomputer 50 to both the luminance signal mute circuit 34 and the mute circuit 35, so that a single-wavelength reference signal can be outputted from the frequency modulator 6 and the chroma signal supplied to the recording amplifier from the terminal 10 can be shut off. The single-wavelength reference signal from the frequency modulator 6 passes through the FM equalizer 7a, the HPF 8, and the recording amplifier 9, and is recorded on the video tape by the video head 11. After the recording, the video tape is rewound in a known well manner, and the recorded reference signal is reproduced by the video head 13. This reproduced reference signal is supplied to the LPF 15, the HPF 16 via the preamplifier 14, and fed also to the reproduced level detector 49. The reproduced level from the detector 49 is stored by the memory 56 via the conversion equation I 52. The memory 56 holds the value until the video tape is replaced.

When the VTR activates the recording mode under this condition, the output control signal from the memory 56 is supplied to the detail emphasis circuit 4a through the switches 58, 59 which have been set to the recording position and, as a result, the amount of emphasis of the detail emphasis circuit is controlled. Further, the output control signal from the memory 56 is applied to the comparator 57 through the switch 58 that has been set to the recording position, and when the video tape is a high-grade tape, a control signal that is at "H" level is outputted from the comparator 57, while when the video tape is a normal tape, a control signal that is at "L" level is outputted therefrom. This control signal is then delivered to the recording system FM equalizer 7a to control the amount of equalization of the FM equalizer 7a.

Accordingly, at the time of recording, a reference signal is recorded and reproduced so that the amount of emphasis of the detail emphasis circuit 4a and the amount of equalization of the FM equalizer 7a can be controlled in accordance with the type of a video tape to be used.

The recording of a video signal from the input terminal 1 on the video tape by the video head 11 through the recording system under the condition that the amount of emphasis and so on have been set is substantially the same as the conventional recording described with reference to FIG. 3.

An operation at the time of reproducing a video signal will be described next. When the VTR reproduces a video signal, the video signal reproduced from the video tape by the video head 13 is amplified by the preamplifier 14, and is supplied to the LPF 15, the HPF 16, and the reproduced level detector 49. The reproduced level detected by the reproduced level detector 49 is converted into the control signal by the conversion equation I 52 of the microcomputer 50, and supplied to both the conversion equation II 55 and the comparator 57 through the switch 58 that is set to the reproducing position. The comparator 57 outputs a control signal at "H" level if the used video tape is a high-grade tape, and a control signal at "L" level if the used vide tape is a normal tape. This control signal is then supplied to the FM equalizer 19a, the peaking circuit 23a, and the line noise canceller 24a, so that the amount of equalization of the FM equalizer 19a and the amount of peaking of the peaking circuit 23a are controlled, which control causes the line noise canceller 24a to be either operative or inoperative.

The chroma level from the LPF 15, which has passed through the chroma signal processing circuit 17 and has been detected by the chroma level detector 53, is applied to the conversion equation II 55 to weigh a signal from the conversion equation I 52 in terms of color saturation, and is thereafter supplied to the noise canceller 25a. Although this noise canceller 25a is controlled so that the amount of cancellation is decreased with increasing reproduced levels detected by the reproduced level detector 49, it is so controlled that the amount of cancellation is increased when the chroma level detected by the chroma level detector 53 is increased even if the reproduced level is high.

Accordingly, the amount of equalization of the reproducing system FM equalizer 19a, the peaking amount of the peaking circuit 23a, and the operation and nonoperation of the line noise canceller 24a are controlled in accordance with the type of a video tape to be used. And further, with the amount of cancellation of the noise canceller 25a being controlled in accordance with both the type of a video tape to be used and the level of a chroma signal to be reproduced, the video signal reproduced from the video tape by the video head 13 reaches the output terminal 26 in substantially the same manner as in the conventional example described with reference to FIG. 3 via the reproducing system, and is outputted on a CRT or the like to produce a reproduced image.

While both the amount of equalization of the reproducing system FM equalizer 19a and the peaking amount of the peaking circuit 23a are controlled in the above alternatively, only one of them may be controlled.

While the chroma level detector 53 is provided so that the amount of cancellation of the noise canceller 25a is controlled in accordance with the chroma level detected by the detector in the above embodiment, the chroma level detector 53 and the conversion equation II 55 may be dispensed with as long as the mesh noise is to be neglected.

While the chroma level detected by the chroma level detector 53 is applied to the conversion equation II 55 so that a control signal from the conversion equation I 52 is weighed in terms of color saturation in the above embodiment, the chroma level may be applied to the conversion equation I 52 so that a control signal from the conversion equation I may be weighed in terms of color saturation. In such a case, the conversion equation II may be dispensed with.

A second embodiment of the invention will be described with reference to FIG. 16.

Figure 16:
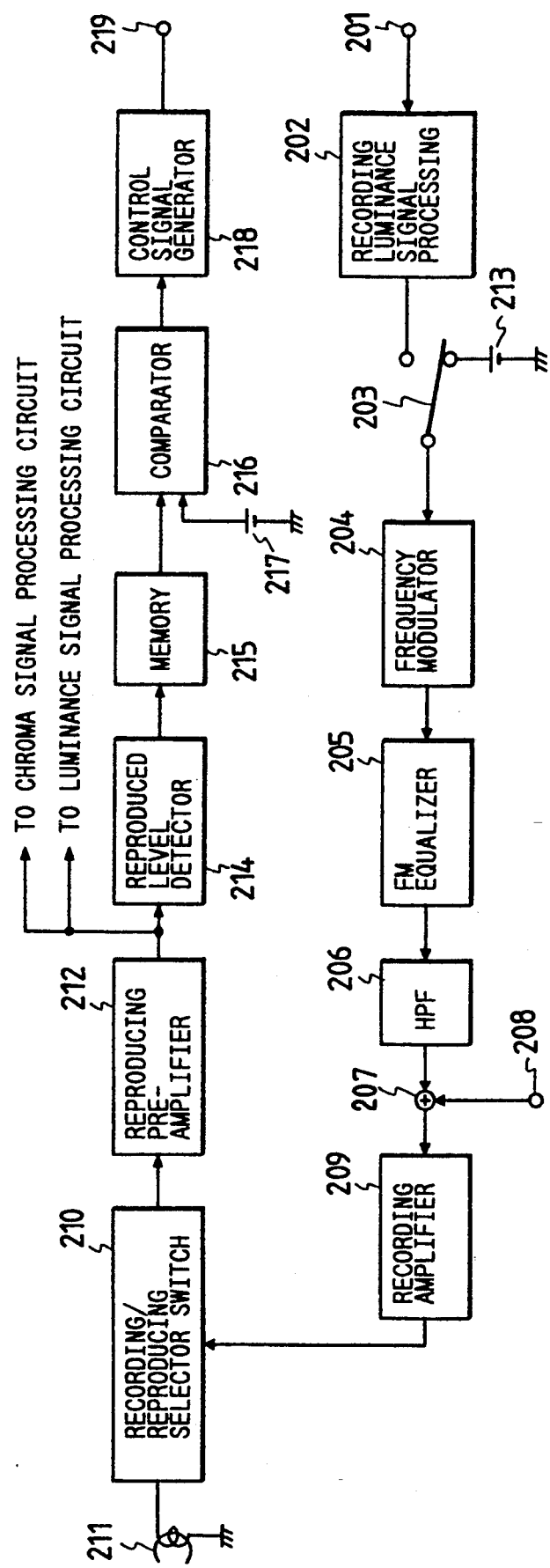
FIG. 16 is a block diagram showing a second embodiment of the invention.

FIG. 16 is a block diagram showing an outline of a main portion of a recording/reproducing system of a home VTR.

In FIG. 16, reference numeral 201 designates an input terminal in a recording system. This terminal 201 receives a video signal to be recorded from a television receiver or the like. The received video signal is applied to a recording luminance signal processing circuit 202, where only a luminance signal is extracted by a LPF or the like. A high-frequency chroma signal separated at the circuit 202 is processed by other means (not shown). The extracted luminance signal is applied to a frequency modulator 204 for frequency modulation. The FM luminance signal from the frequency modulator 204 has its low frequencies boosted, and the thus processed luminance signal is then applied to an adder 207 via a HPF 206. The adder 207 adds this luminance signal to the low-frequency converted chroma signal from a terminal 208, and the added signal is recorded on a video tape (not shown) by a video head 211 after having been passed through a recording amplifier 209 and a recording/reproducing selector switch 210.

A color video signal reproduced by the video head 211 from the video tape is supplied to a chroma signal processing circuit (not shown) and a not shown luminance signal processing circuit (not shown) via a reproducing preamplifier 212, so that a color image is reproduced by a CRT (not shown) or the like. The above circuits are the same as those used in ordinary home VTRs except for a switch 203.

In FIG. 16, reference numeral 213 designates a dc voltage source which is used to provide a predetermined dc voltage to the frequency modulator 204 through the switch 203 in setting the recording and reproducing characteristics so as to match a used video tape. Upon input of the predetermined dc voltage, the frequency modulator 204 outputs a single-wavelength reference signal (e.g., 3.8 MHz) which corresponds to the dc voltage, and this reference signal is recorded on the video tape by the video head 211.

The recorded reference signal is reproduced by the video head 211, and fed to a reproduced level detector 214 via the reproducing preamplifier 212. The reproduced level of the reference signal detected by the reproduced level detector 214 is stored in a memory 215. The reproduced level of the reference signal stored in the memory is compared with the reference voltage of a dc voltage source 217, and a comparison error signal is fed to a control signal generator 218.

Incidentally, the reference voltage is set to the same level as the reproduced level outputted from the memory 215 when the reference signal is recorded on a reference tape and reproduced therefrom.

The control signal generator 218 generates a control signal corresponding to the comparison error signal, and the control signal is supplied to a detail emphasis circuit (not shown), an FM equalizer 205, both belonging to the recording system, as well as to a FM peaking circuit (not shown) or a noise canceller (not shown), both belonging to the reproducing system, thereby controlling (setting) the recording or reproducing characteristics.

In the VTR having the above construction, after the recording or reproducing characteristics have been set while connecting the dc voltage source 213 to the frequency modulator 204 by the switch 203, the switch 203 is connected to the recording luminance signal processing circuit 202, and recording or reproducing of a video signal is performed in a manner described above. Since the recording or reproducing characteristics are adjusted so as to match the video tape characteristics during such recording or reproducing, an optimal performance can be exhibited by the video tape.

A third embodiment of the invention will be described with reference to FIG. 17.

Figure 17:
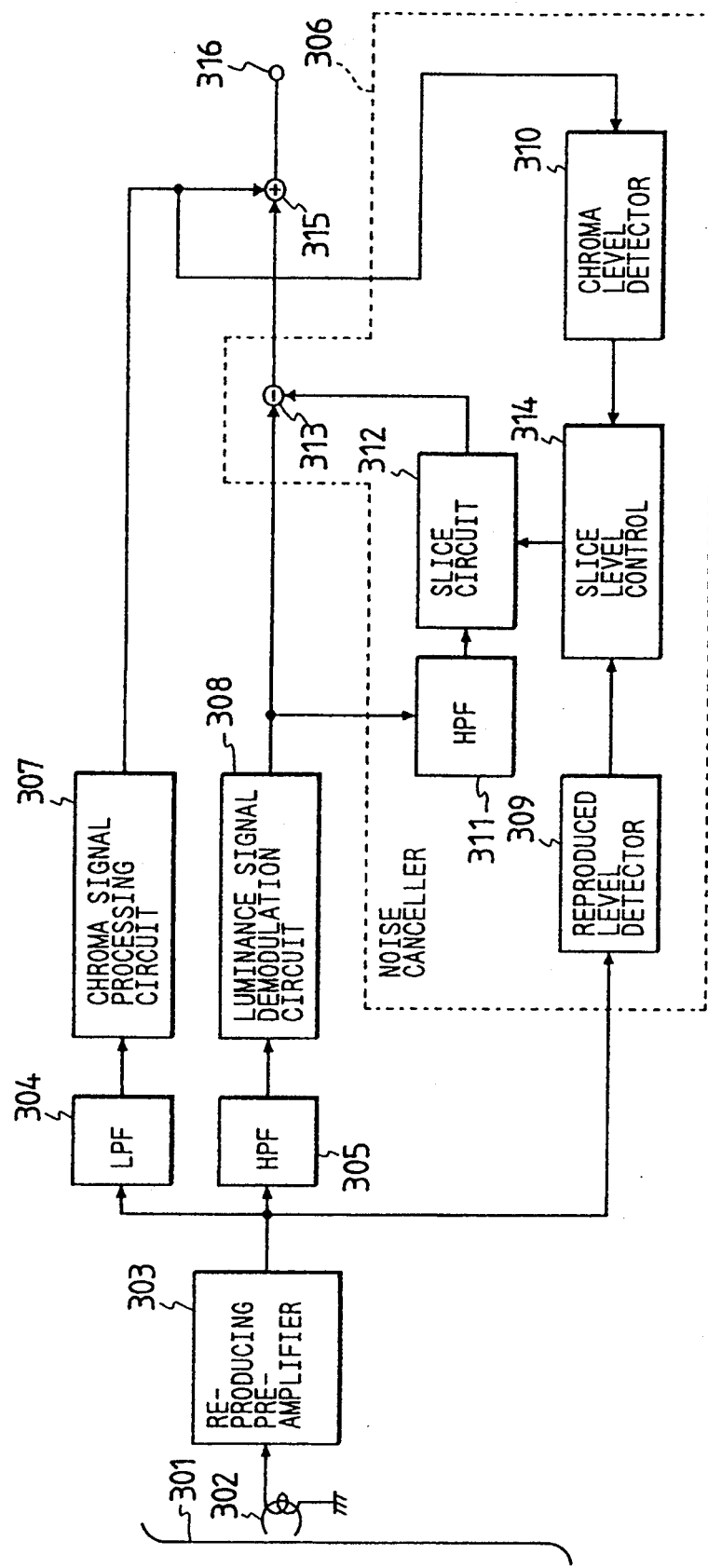
FIG. 17 is a block diagram showing a third embodiment of the invention.

FIG. 17 is a block diagram showing an outline of a main portion of a reproducing system of a VTR. In FIG. 17, reference numeral 301 designates a video tape.

A color video signal recorded on this tape is reproduced by a video head 302. The color video signal reproduced by the head is amplified by a reproducing preamplifier 303 and supplied to a LPF 304, a HPF 305, and a noise canceller 306. The LPF 304 extracts only a chroma signal from the color video signal, and the extracted chroma signal is fed to a chroma signal processing circuit 307. The chroma signal processing circuit 307 converts the low-frequency converted signal into a chroma signal of a subcarrier band. The HPF 304 extracts an FM luminance signal from the color video signal and this FM signal is demodulated by a luminance signal demodulation circuit 308.

The noise canceller 306 includes: a reproduced level detector 309; a chroma level detector 310; a HPF 311; a slice circuit 312; a subtractor 313; and a slice level control circuit 314. A luminance signal from the luminance signal demodulation circuit 308 has its high-frequency components extracted therefrom by the HPF 311, and the extracted high-frequency components are fed to the slice circuit 312. The slice circuit 312 has a slice level for removing components whose levels are larger than a predetermined level, and removes the components in excess of such slice level. The low-level components in high frequencies (deemed as noise components) which have been passed through the slice circuit 312 are supplied to the subtractor 313, and are subtracted from the luminance signal delivered from the luminance signal demodulation circuit 308. The slice level of the slice circuit 312 is controlled by a signal from the slice level control circuit 314. The slice level control circuit 314 has its output signal controlled not only by the level of an FM luminance signal applied from the reproducing preamplifier 303 and detected by the reproduced level detector 304, but also by the level of a chroma signal applied from the chroma signal processing circuit 307 and detected by the chroma level detector 310.

That is, the slice level of the slice circuit 312 is controlled so as to be decreased with increasing reproduced levels of an FM luminance signal, and increased with increasing levels of a chroma signal.

Therefore, even in the case where the reproduced level of the FM luminance signal is high so that the amount of noise cancellation is decreased, the amount of noise cancellation becomes increased as long as the level of the chroma signal is high and, as a result, the unwanted components b, d are canceled.

The luminance signal whose noise has been canceled in this way reaches an adder 315 from the subtractor 313, is added to the chroma signal from the chroma signal processing circuit 307 at the adder, and is then applied to a not shown CRT or the like from an output terminal 316. As a result, a reproduced image can be obtained.

A fourth embodiment of the invention will be described with reference to FIG. 18.

Figure 18:
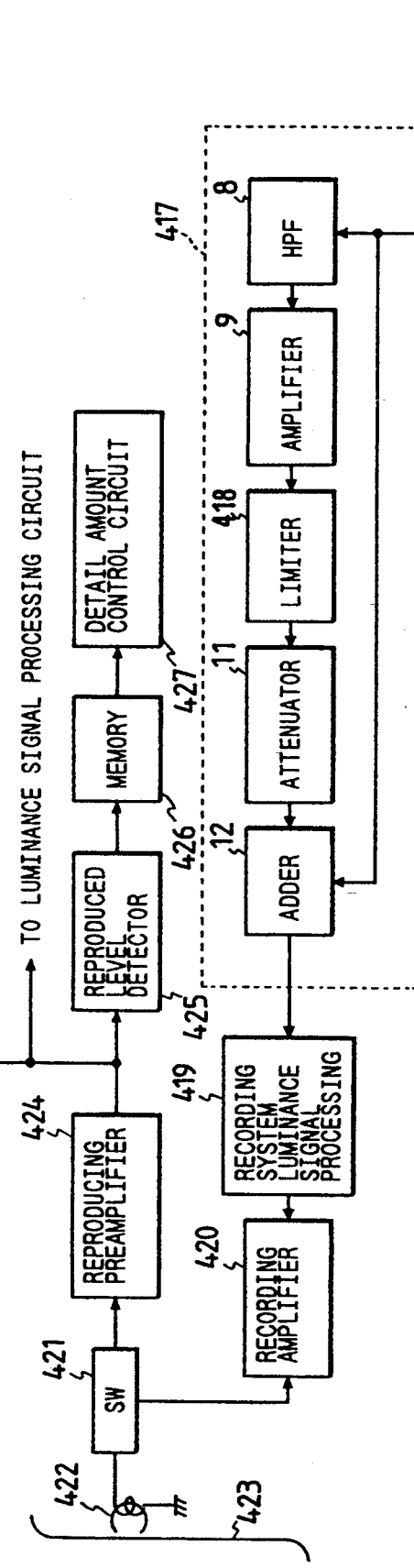
FIG. 18 is a block diagram showing a fourth embodiment of the invention.

FIG. 18 is a block diagram showing an outline of a main portion of a recording/reproducing system of a home VTR.

In FIG. 18, reference numeral 415 designates an input terminal, which receives a video signal to be recorded from a television receiver or the like. The received video signal is applied to a luminance signal processing circuit 416, where only a luminance signal is extracted therefrom by a LPF or the like. A high-frequency chroma signal separated at the circuit 416 is processed by other means (not shown). The extracted luminance signal is supplied to a detail emphasis circuit 417, where its high-frequency, small-level (apparatus) components are emphasized. The detail emphasis circuit 417, which is similar to the detail emphasis circuit 4 in the conventional example, includes a HPF 8, an amplifier 9, an attenuator 11, and an adder 12, and is constructed in the same manner except for a limiter 10. A limiter 418 which replaces the limiter 10 can set a variable limit level.

The luminance signal whose high-frequency small-level signal components have been emphasized at the detail emphasis circuit 417 is applied to a recording system luminance signal processing circuit 419, where its high frequencies are emphasized more than its low frequencies, and the thus emphasized signal is frequency-modulated thereafter, added to a low-frequency converted chroma signal by other means (not shown), and then amplified by a recording amplifier 420. The video signal, which has been passed through the recording amplifier 420, is supplied to a video head 422 via a recording/reproducing selector switch 421 and then recorded on a video tape 423.

During reproduction, the video signal reproduced from the video tape 423 by the video head 422 is amplified by a reproducing preamplifier 424 after having passed through the recording/reproducing selector switch 421, processed by a well known chroma signal processing circuit and a luminance signal processing circuit (both not shown) and, as a result, an image is reproduced on a CRT (not shown).

The construction of the recording/reproducing system of the VTR described above is the same as that of a generally known home VTR except that the limit level of the limiter 418 is variable.

In the VTR shown in FIG. 18 an oscillator (not shown), which generates a single-wavelength signal of a recording/reproducing frequency band, e.g., a 3.8 MHz signal which corresponds to the top of a FM video signal of a PAL system is provided, and the signal from this oscillator is supplied to the recording amplifier 420 at the time tests are conducted. This single-wavelength signal is recorded on the video tape 423 by the video head 422. The recorded single-wavelength signal is reproduced by the video head 422 after the video tape 423 has been rewound, and then amplified by the reproducing preamplifier 424. The thus reproduced single-wavelength signal is subjected to envelope detection by a reproduced level detector 425 to detect its reproduced level. The detected reproduced level is stored in the memory 426. Incidentally, the stored reproduced level remains unerased until the video tape 423 is ejected. The stored reproduced level is applied to a detail amount control circuit 427. In this circuit 427 the reproduced level of a normal tape is preset, and this preset reproduced level and the applied reproduced level are compared so that the limit level of the limiter 418 is varied in accordance with the error observed in the comparison.

That is, if the type of the video tape 423 is a normal tape, the reproduced level stored in the detail amount control circuit 427 and the reproduced level applied to the detail amount control circuit are equal to each other. As a result, the limit level of the limiter 418 becomes optimal for the normal tape. If the type of the video tape 423 is a high-grade tape, the reproduced level applied to the detail amount control circuit 427 is higher than that stored in the detail amount control circuit 427 and, as a result, the limit level of the limiter 418 is varied in accordance with the result of the comparison, thereby allowing comparatively high-level components to pass through the limiter 418. Accordingly, the detail emphasis circuit 417 sets its characteristics so that the high-frequency small-level signal components can be emphasized more for the high-grade tape than for the normal tape.

As described above, when the high-grade tape is used, the characteristic of the detail emphasis circuit 417 is automatically set to the high-grade mode. As a result, the high frequencies of the luminance signal of a recorded/reproduced video signal can be produced at a sufficient level, thus allowing images without blurs to be reproduced.

While the oscillator which generates a 3.8 MHz single-wavelength signal is used for test recording and reproducing in the above embodiment, a dc voltage equivalent to the top level of a synchronizing signal may instead be supplied to the frequency modulator within the recording system luminance signal processing circuit 419 so that a 3.8 MHz single-wavelength signal may be generated from the frequency modulator. It goes without saying that the level of this single-wavelength signal is not limited to 3.8 MHz.

Figure 19:
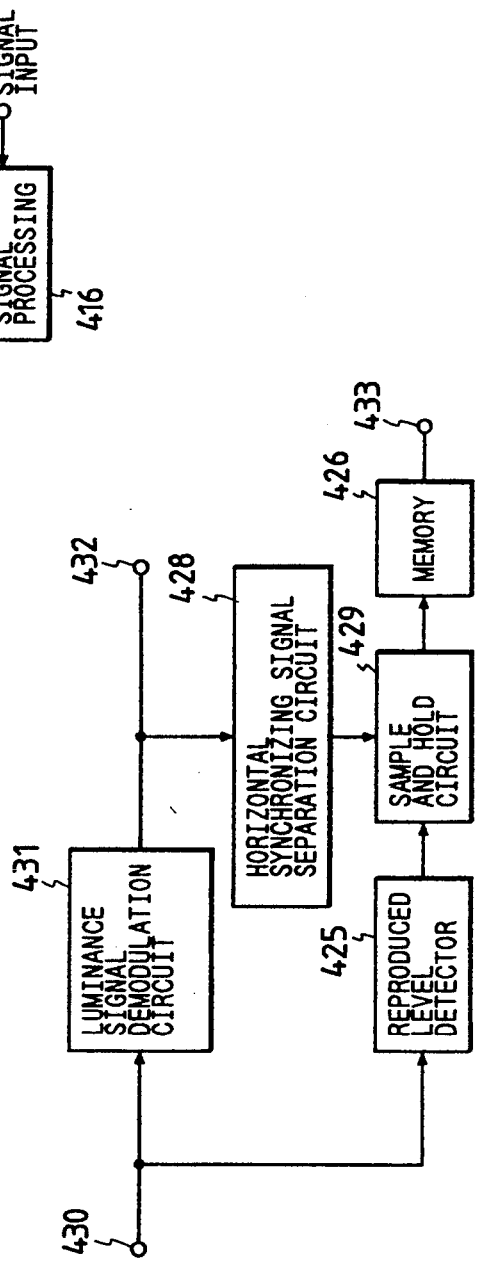
FIG. 19 is a diagram showing an exemplary application of the fourth embodiment of the invention.

Further, instead of recording a single-wavelength signal as a test signal as described above, a video signal from the input terminal 415 may be recorded through the recording system and, to reproduce the video signal, the video signal may be processed by a system including a horizontal synchronizing signal separation circuit 428 and a sample and hold circuit 429 as shown in FIG. 19. In FIG. 19, reference numeral 430 designates an input terminal, which delivers an FM signal from the reproducing preamplifier 424. This FM signal has its reproduced level detected by the reproduced level detector 425 and then supplied to a luminance signal demodulation circuit 431. The luminance signal demodulation circuit 431 constitutes part of the aforesaid luminance signal processing circuit, and the demodulated luminance signal is not only outputted to a subsequent stage from an output terminal 432 but also supplied to the horizontal synchronizing signal separation circuit 428 to separate a horizontal synchronizing signal. The sample and hold circuit 429 receives a envelope-detected reproduced FM signal from the reproduced level detector 425, and a stable portion of the received signal, which portion corresponding to the horizontal synchronizing signal, is sampled and held by the horizontal synchronizing signal from the horizontal synchronizing signal separation circuit 428. The thus sampled/held reproduced level is stored in the memory 426, and the stored reproduced level is supplied to the detail amount control circuit 427 from an output terminal 433.

A horizontal synchronizing signal obtainable from a well known AFC circuit may be used as the separated horizontal synchronizing signal.

While the limit level of the limiter 418 is made variable by the output of the detail amount control circuit 427, the amount of attenuation from the attenuator 411 may instead be controlled by the output of the detail amount control circuit 427. In this case, the characteristics of the attenuator 11 may be set so that the amount of attenuation is decreased in order to emphasize the high-frequency small-level signal components with the detail emphasis circuit 417 when a high-grade tape is used.

A fifth embodiment of the invention will be described with reference to FIG. 20.

Figure 20:
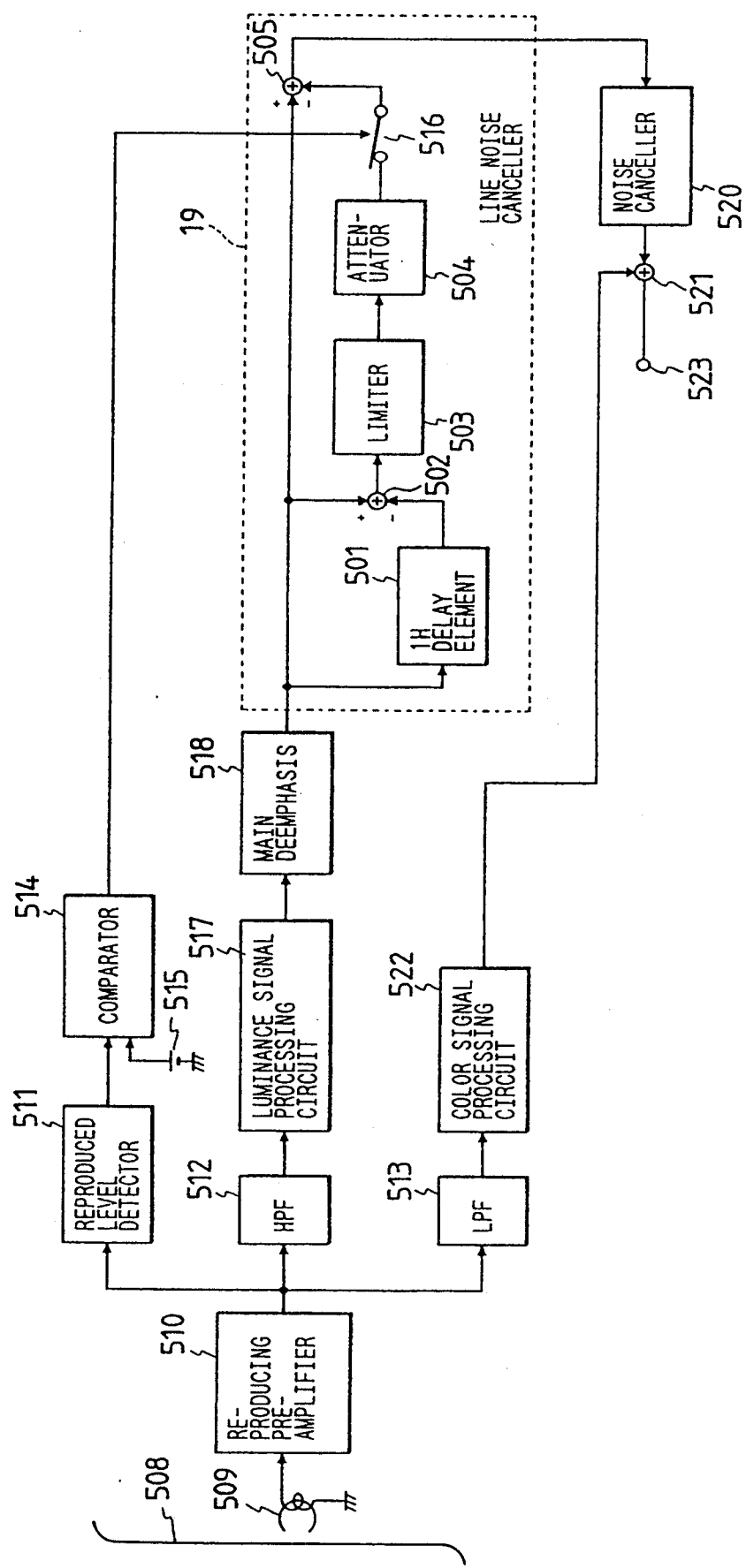
FIG. 20 is a diagram showing a fifth embodiment of the invention.

FIG. 20 is a block diagram showing an outline of a main portion of a reproducing system of a VTR. In FIG. 20, reference numeral 508 designates a video tape. A video signal reproduced from this tape by a video head 509 is amplified by a reproducing preamplifier 510, and supplied to a reproduced level detector 511, a HPF 512, and a LPF 513.

At the reproduced level detector, the level of, e.g., a horizontal synchronizing signal of the video signal is sampled and held, so that the level of the video signal is detected as a dc level. The detected dc level is applied to a comparator 514, where it is compared with a reference voltage from a dc voltage source 515. The reference voltage is set to a value higher than a recording-/reproducing level when a reference tape is used as a video tape 508. If the dc level is higher than the reference voltage, a switch 516 (described later) gets opened, and if it is lower, the switch gets closed.

In the HPF 512 a luminance signal is extracted from the video signal, and this luminance signal is frequency-demodulated by a luminance signal processing circuit 517, subjected to deemphasis by a main deemphasis 518, and applied to a line noise canceller 519. As in the conventional example, the line noise canceller 519 includes: a 1H delay element 501; an adder 502; a limiter 503; an attenuator 504; an adder 505; and the switch 516 interposed between the attenuator 504 and the adder 505. When the switch 516 is closed, a signal from the attenuator 504 is applied to the adder 505 to operate the line noise canceller 519, while when the switch 516 is opened, a signal to be supplied to the adder 505 from the attenuator 504 is shut off, thereby causing the line noise canceller 519 to be inoperative the line noise canceller 519 (not via the line noise canceller when the line noise canceller is inoperative) is supplied to a noise canceller 520. The noise canceller is, as is known well, separates high-frequency components in a reproduced luminance signal at which noise tends to concentrate by a filter; extracts low-level signal components by the slice circuit; and subtracts the high-frequency low-level components from the original luminance signal while assuming the high-frequency low-level components as noise. The luminance signal that has been passed through the noise canceller 520 is then supplied to an adder 521.

At the LPF 513 only a low-frequency converted color signal is extracted from the video signal from the reproducing preamplifier 510, and the extracted signal is supplied to a color signal processing circuit 522. At the color signal processing circuit 522, the low-frequency converted color signal is converted into a color signal of a subcarrier band.

The color signal from the color signal processing circuit 522 and the luminance signal from the noise canceller 520 are added together, and the added signal is supplied to a not shown CRT or the like via an output terminal 523 to reproduce a color image.

In the VTR, when a normal tape is used as the video tape 508, the dc level from the reproduced level detector 511 is lower than the dc voltage source 515, and this closes the switch 516 and thus makes the line noise canceller 519 operating. On the other hand, when a high-grade tape is used, the dc level from the reproduced level detector 511 is higher than the reference voltage from the dc voltage source 515, and this opens the switch 516 and thus makes the line noise canceller 519 inoperative.

As described in the foregoing, the invention is applied to the magnetic recording/reproducing apparatus which includes the reproduced level detector for detecting the level of a reproduced signal and the memory for storing the reproduced level detected by the detector; and when recording a video signal, the video signal is recorded and reproduced in advance, and the reproduced level of the video signal is stored in the memory, so that the amount of emphasis of the recording system detail emphasis circuit and the amount of equalization of the recording system FM equalizer are controlled in accordance with the stored reproduced level; while when reproducing the video signal, the level of the reproduced FM luminance signal is detected by the reproduced level detector, so that the amount of equalization of the reproducing system FM equalizer (or the amount of peaking of the peaking circuit), the amount of cancellation of the line noise canceller, and the amount of cancellation of the noise canceller are respectively controlled in accordance with the detected reproduced level.

This allows the characteristic of a video tape to be controlled in accordance with the type thereof on an apparatus-wide and integrated basis.

Therefore, the optimal performance of a video tape can be obtained in accordance with the type thereof, and deterioration in the characteristic of a video tape can adequately be compensated for in accordance with the type thereof.

Further, the magnetic recording/reproducing apparatus also includes the chroma level detector which serves to detect the level of a reproduced chroma signal when a low-frequency converted and recorded chroma signal is reproduced and further converted into a subcarrier band, so that the amount of cancellation of the noise canceller can be controlled in accordance with the chroma level detected by the chroma level detector. Therefore, the chroma signal-induced unwanted components introduced into the reproduced luminance signal can also be canceled, thereby eliminating mesh noise on reproduced images.

Further, the invention is applied to the magnetic recording apparatus or magnetic recording/reproducing apparatus which includes the frequency modulator for frequency-modulating an information signal to be recorded in a recording system, and in which a reference signal is recorded and reproduced, so that recording or reproducing characteristics of the information signal are controlled in accordance with the level of the reproduced reference signal, and as a result, the recording or reproducing characteristics can be set so as to match the characteristic of a magnetic recording medium. And such an apparatus further includes the dc voltage source for selectively supplying a predetermined level of a dc voltage to the frequency modulator, so that the output of said frequency modulator obtained by supplying the dc voltage to the frequency modulator is used as the reference signal. Therefore, a single-wavelength reference signal can be generated without employing an independent oscillator, which contributes to simplifying the construction of the apparatus.

Further, the invention is applied to the noise canceller in a magnetic reproducing apparatus, the noise canceller comprising: the frequency-modulated reproduced level detector for detecting a reproduced level of a reproduced frequency-modulated luminance signal; the means for extracting noise components from a luminance signal demodulated from the frequency-modulated luminance signal; the slice circuit having a slice level for removing components whose levels are higher than a predetermined level from the noise components and controlling the slice level so as to decrease with increasing values of the reproduced level; and the subtractor for subtracting the output of the slice circuit from the luminance signal. And such a noise canceller further includes the chroma level detector for detecting a level of a reproduced chroma signal, so that the slice level of the slice circuit is controlled so as to increase with increasing values of detected chroma level. Therefore, the slice level of the slice circuit is decreased with increasing values of the reproduced level of the FM luminance signal, and is increased with increasing values of the chroma signal level. As a result, even in the case where the reproduced level of the FM luminance signal is increased and the amount of cancellation is decreased, the amount of noise cancellation is increased when the chroma signal level is high, thus canceling the unwanted components and eliminating the mesh noise on reproduced images.

Further, the invention is applied to the magnetic recording apparatus in which a luminance signal of a video signal to be recorded is subjected to frequency modulation and then to single-sideband recording and the detail emphasis circuit for emphasizing a high-frequency small-level components of the luminance signal before frequency modulation is provided, and in such an apparatus, the means for detecting the level of a reproduced signal and store the detected level is further provided, so that the amount of emphasis of the detail emphasis circuit is controlled in accordance with the stored detected level. Therefore, the type of a used magnetic recording medium can be Judged by the level of a reproduced signal and the amount of emphasis can be optimized for the magnetic recording medium. As a result, the high-frequency level of the reproduced signal can be decreased, thereby preventing reproduced images from blurring, etc.

Further, the invention is applied to the magnetic recording apparatus having a line noise canceller, in which the line noise canceller delays a luminance signal of a reproduced video signal for a single horizontal scanning period, subtracts the delayed luminance signal from the nondelayed original luminance signal by a subtractor, extracts only a small-level signal from the subtracted signal, the small-level signal being deemed as a noise component, and subtracts the small-level signal from the original luminance signal to substantially cancel the noise component, and in such an apparatus, the means for detecting a level of the reproduced video signal is provided, and the line noise canceller is made inoperable when the level of the reproduced video signal detected by the means is higher than a predetermined level. Therefore, when a video tape containing less noise such as a high-grade tape, the line noise canceller can be made inoperative automatically in order to give precedence to detail reproducibility.

What is claimed is:

1. A magnetic recording/reproducing apparatus comprising:
   a dc voltage source outputting a predetermined dc voltage;
   a switch for switching its output between said dc voltage and an information signal to be recorded on a recording medium;
   a frequency modulator for frequency-modulating said output of said switch to output one of (i) a frequency-modulated information signal in response to said information signal and (ii) a reference signal, consisting of a single-wavelength component, in response to said dc voltage;

means for recording and reproducing said reference signal;

means for detecting a level of said reference signal when it is reproduced;

means for generating a control signal in response to the level of said reference signal detected by said means for detecting to control, during an information signal recording/reproducing mode, one of a recording and a reproducing characteristic of the information signal in accordance with said control signal, whereby the recording or reproducing characteristic is set so as to match a characteristic of said recording medium.

* * * * *